United States Patent [19]

McGraw et al.

[11] Patent Number: 4,547,813
[45] Date of Patent: Oct. 15, 1985

[54] APPARATUS FOR CONTROLLING LIGHT DISTRIBUTION IN LINE SCAN OPTICAL IMAGING SYSTEMS

[75] Inventors: Cobern E. McGraw, Danbury, Conn.; Robert Gazzero, Poway, Calif.; David E. Christian, Danbury, Conn.

[73] Assignee: Burroughs Corporation, Detroit, Mich.

[21] Appl. No.: 574,456

[22] Filed: Jan. 27, 1984

[51] Int. Cl.$^4$ .................. H04N 1/04; H04N 1/10
[52] U.S. Cl. .................. 358/285; 358/293; 358/294; 250/237 R
[58] Field of Search .................. 358/285, 293, 294; 362/222, 223, 307, 311, 351, 303, 293; 250/237 R

[56] References Cited

U.S. PATENT DOCUMENTS

| | | | |
|---|---|---|---|
| 4,149,197 | 4/1979 | Kos et al. | 358/294 |
| 4,220,978 | 9/1980 | Phyins et al. | 358/293 |
| 4,290,086 | 9/1981 | Spencer et al. | 358/285 |
| 4,305,100 | 12/1981 | Hattori | 358/293 |
| 4,321,630 | 3/1982 | Kramer | 358/293 |
| 4,432,044 | 2/1984 | Lautzenheiser | 362/311 |
| 4,446,364 | 5/1984 | Hayashi et al. | 358/293 |
| 4,464,681 | 8/1984 | Jacobs et al. | 358/293 |

Primary Examiner—Howard W. Britton
Assistant Examiner—John K. Peng
Attorney, Agent, or Firm—Mark T. Starr; Kevin R. Peterson

[57] ABSTRACT

Disclosed is a linear strip mask for controlling image plane light level distribution in line scan optical imaging systems. The mask is fabricated photographically on a strip of emulsion coated mylar. The photographic image which is recorded on the mylar strip is a pattern of alternating black and clear sections, the pattern of black sections chosen to modify the non-uniform light pattern output by the system's illumination source to obtain uniform image plane illumination. Also disclosed is a line scan optical imaging system utilizing strip masks to compensate for the non-uniform light output along the length of two fluorescent tubes which illuminate the document scan line and the cos$^4$ drop-off of the imaging system's lens. Light reflected off the document scan line is transmitted via a four bounce folded mirror system and is received by the lens system. Behind the lens system is positioned a multielement photoelectric sensor for converting light reflected from each unit area of the document line being scanned into electrical signals.

24 Claims, 4 Drawing Figures

APPARATUS FOR CONTROLLING LIGHT DISTRIBUTION IN LINE SCAN OPTICAL IMAGING SYSTEMS

BACKGROUND OF THE INVENTION

The present invention relates in general to electro-optical document reading systems such as facsimile equipment. More particularly, the present invention relates to a mask for controlling image plane light level distribution in line scan optical imaging systems. Still more particularly, the present invention relates to a linear strip mask for controlling the illumination of a line of text to be read by a line scan optical imaging system.

In many electro-optical document reading devices, light is directed onto a line of a printed document, and light is reflected from each elemental area of the line of the printed document in accordance with the color or blackness of the elemental area. The reflected light is fed through an optical system, usually including a spherical lens system, to electrical apparatus in which the reflected light is converted to electrical signals which are used to reproduce the document at a remote location. Typical of such an electrical apparatus is a photoelectric sensor, positioned behind the lens, which converts light reflected from each unit area of a line of print on the document to electrical signals. One suitable photoelectric device comprises an integrated circuit chip having a large number of tiny photosensitive elements arranged in a line, each element receiving light from a unit area of each line of print.

In the prior art, various light sources have been utilized to illuminate the line of text being scanned. Thus, in U.S. Pat. No. 4,220,978, an electro-optical document reader similar to that previously discussed teaches that either incandescent lamps, fluorescent lamps or light-emitting diodes may be utilized as a source of illumination.

In all of the prior art systems, means must be included to provide a substantially uniform light distribution at the image plane of the electrical apparatus which converts the reflected light to electrical signals. To provide this uniform distribution at the image plane of the electrical apparatus, a light distribution at the object plane (or document) that is brighter at the edges must be provided in order to compensate for the $\cos^4$ drop-off of the lens system. Further, in a system employing a fluorescent tube to illuminate a line of text, the light intensity output along the length of the tube is roughly of a sinusoidal pattern. That is, more light is output at the center of the tube's length than at its ends. Thus, if a line of printed text were positioned parallel to the fluorescent tube, more light would hit the words at the center of the line than the words at either end of the line. As a consequence, assuming the black/white content was identical along the entire line of text, more light will be reflected off points at the center of the line of text than from points at the ends of the line of text. Since the electrical apparatus detects black and white areas along the scan line based on the amount of reflected light, the use of an uncorrected fluorescent tube output to illuminate a scan line would require that the light sensitivity of each element in the electrical apparatus be tailored to its position with respect to the line of text. Since such customization would be quite expensive to implement, various techniques have been proposed to provide a substantially uniform light distribution at the input to the electrical conversion apparatus.

In one embodiment of the system taught in U.S. Pat. No. 4,220,978, two incandescent lamps are disposed close to the rear opening of a light guide which directs light toward the document. The lamps are spaced apart so that some of the light rays from the lamps strike the document directly and some strike the document through reflections from the side walls and the top and bottom plates of the light guide, so that the total light which reaches the document has the desired distribution of light intensity across the document; viz., it is brighter at the document edges. In this embodiment, light reflected from the document is fed back through the light guide, then through a lens and onto a photoelectric sensor. The disadvantages of this system is in the fact that a light guide is required, increasing the system's cost. In addition, the system is relatively large due to the required length of the light guide.

In order to do away with the need for a light guide, various systems utilizing a fluorescent tube have been suggested. In all known prior art systems utilizing a fluorescent light source, the illumination subsystem and imaging subsystem are not in the same plane as the most direct path from the light source to the document. Therefore, there are two light paths in these systems which may be modified in order to obtain a uniform light distribution at the image plane. Thus, a first option is to modify the light output from the fluorescent tube before it reaches the document. The second option is to modify the reflected light pattern between the document and lens or electrical detection apparatus.

In U.S. Pat. No. 4,220,978, a system is disclosed wherein a single fluorescent bulb is suitably masked by an opaque coating to allow greater light output at its ends than at its center. By using the opaque coating, the light intensity at a distance from the bulb has the appropriate distribution on the scan line of the document. In this system, the bulb is positioned next to a light guide which directs the light to the document. Light reflected from the document does not return through the light guide, but travels along a path disposed outside the light guide. Thus, the light guide is disposed at such an angle to the document that light is reflected from the document on an axis which is disposed above the light guide to a suitable optical apparatus and electro-optical pickup mechanism. Although this system solves the problem of providing the appropriate light intensity along the scan line, it requires that the fluorescent tubes be suitably coated with the opaque mask. In addition, this system requires the use of a light guide which enlarges the size of the system and adds to its cost.

Systems utilizing a fluorescent tube, but not requiring a light guide, are also known in the prior art. In such systems, the fluorescent tube is positioned parallel to and above the line of text to be scanned, and in close proximity to the document. The light from the tube thus travels down at an acute angle to illuminate the scan line. A lens is positioned a distance from the document at the same height as the scan line. The lens focuses the reflected light onto an array of CCD sensors positioned behind the lens. In this system, the nonlinear light intensity output of the fluorescent tube is compensated for by one of two methods.

In the first method, a line aperture is used which has an opening which varies in size across the length of the aperture. Thus, the aperture opening is narrow at the center and widens as one moves towards the ends of the aperture. This aperture is positioned in the reflected light path between the scan line on the document and the lens. This variable size aperture thus controls the amount of light entering the lens from each point in the object plane (viz., the document scan line).

The first method suffers from two major drawbacks. The aperture must be accurately positioned along the axis normal to the scan line axis. If not positioned correctly, the light level will not be as desired. The second drawback is the reduction of modulation transfer of the imaging system due to the effect of an obscured lens aperture.

The second method utilizes a photographically produced continuous tone gray-scale gradient filter which varies in density across the length of the filter. As in the first method, the line filter is positioned between the lens and the object plane where it controls the amount of light entering the lens from each point on the object plane.

The second method also suffers from two major drawbacks. The varying density filter creates a reduction in the modulation transfer of the imaging system due to the scattering of light by the photographic emulsion. The second major drawback is the excessive cost of continuous tone gray-scale gradient filters.

It is the general object of the present invention to overcome the above-mentioned drawbacks of the prior art by providing an improved apparatus for controlling the image plane light level distribution in line scan optical imaging systems.

It is another object of the present invention to provide a repeatable and low cost apparatus for controlling the light level distribution in line scan optical imaging systems.

It is yet another object of the present invention to provide a mask for modifying the light intensity output from a light source.

It is a further object of the present invention to provide a fluorescent tube mask which compensates for the non-uniform light output along the length of a fluorescent tube and which need not be accurately aligned in the axis normal to the scan line axis.

It is still another object of the present invention to provide a mask for controlling light level distribution in line scan optical imaging systems which does not reduce imaging system modulation transfer.

It is still a further object of the present invention to provide a low cost and compact system for controlling light level distribution in line scan imaging systems.

It is yet another object of the present invention to provide a fluorescent tube mask which compensates for the $\cos^4$ drop-off of reflected light prior to transmission through the lens of a line scan optical imaging system.

These and other objects, features and advantages of the present invention will become more apparent from the following detailed description of the preferred embodiment when read in conjunction with the drawings.

SUMMARY OF THE INVENTION

According to the invention, a linear strip mask is provided for controlling image plane light level distribution in line scan optical imaging systems.

In the preferred embodiment, the mask is fabricated photographically on a strip of emulsion coated mylar. The photographic image which is recorded on the mylar strip is a pattern of alternating black and clear sections. The pattern of black sections is chosen to provide the desired light level distribution for the imaging system.

Although the preferred embodiment utilizes photographic techniques to produce the mask pattern on the clear mylar, those skilled in the art will appreciate that various printing or other techniques may be utilized to apply the desired pattern of black lines 42 on the clear mylar. Thus, there is no optical reason why the desired pattern of lines 42 could not be printed on the mylar or another type of clear or tinted substrate using impact, silkscreen, lithographic, laser, or other printing techniques.

In the preferred embodiment, the mask is utilized to produce a uniformly illuminated image plane in a line scan optical imaging system utilizing fluorescent lamps to illuminate the system. In this application, the mask is fabricated with a greater density of black lines (or sections) in the center regions and a decreasing density of black lines as the edges of the mask are approached. The effect of the mask is to restrict the light level in the center of the object field. Since the intensity of the light output by the fluorescent tubes is greatest at the center of the tubes and decreases as the ends of the tube are approached, the mask serves to compensate for the non-uniform light output along the length of the tubes so that a light level distribution is obtained on the non-illuminated side of the mask that is brighter at the edges. Then, as the illumination line passes through the lens system, there is a further brightness drop-off at the edges due to the $\cos^4$ drop-off As a result, a uniform image plane illumination line is obtained at the system's electrical detection apparatus.

DESCRIPTION OF THE PREFERRED EMBODIMENT

Figure 1:
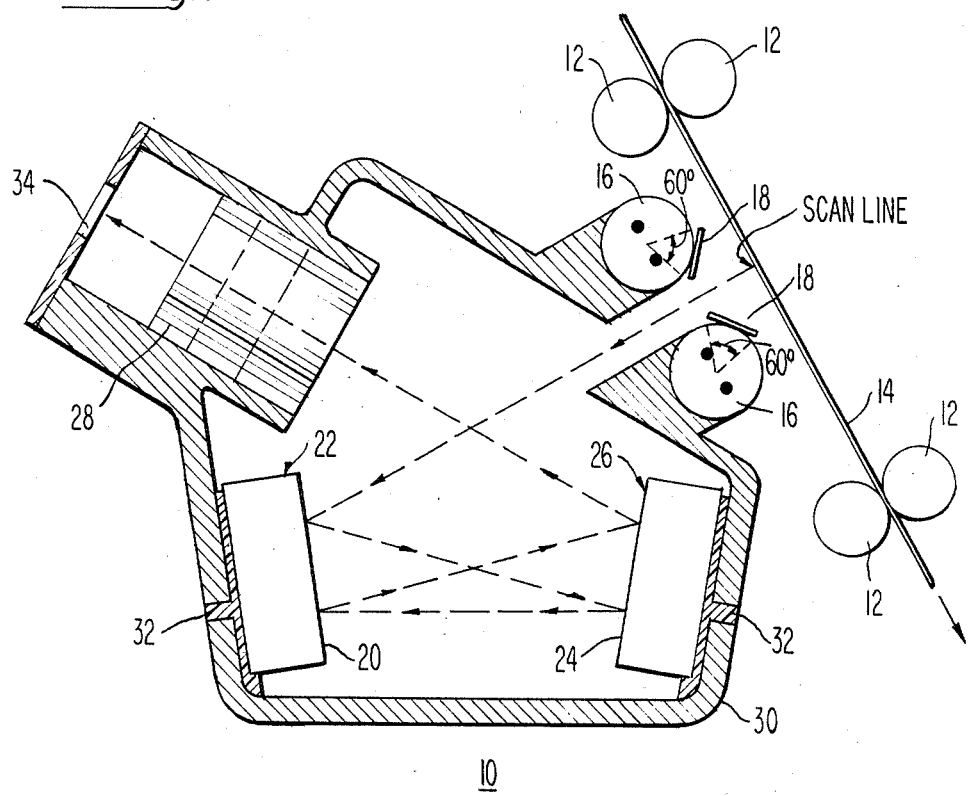
FIG. 1 is a side view of a line scan optical imaging system utilizing the mask to control light level distribution.

FIG. 1 illustrates the general environment that the present invention functions in. The system 10 includes a motor (not shown) which drives feed rollers 12 to incrementally advance the document 14 being read in the direction shown. The motor may be controlled to advance the document one scan line position at a time or may advance the document continuously. In the latter mentioned case, reading takes place on the fly.

A lamp circuit (not shown) supplies power to fluorescent tubes 16. In the preferred embodiment, Sylvania sixty degree aperture fluorescent tubes are utilized. These tubes only have a phosphor coating on three hundred degrees of their inner surface. As a result, internally generated light is emitted from the remaining non-coated surface of the tubes.

Those skilled in the art will appreciate that standard fluorescent tubes could be utilized instead of the sixty degree aperture type. In such case, a housing may be provided around a portion of each tube 16 to only allow light transmitted from a portion of each tube's outer surface to reach the document.

As shown in FIG. 1, the tubes 16 are positioned so that light exiting the aperture of the tubes 16 will illuminate the document 14 line being scanned.

The construction of the masks 18 will be discussed in detail below. For the moment, suffice it to say that the masks 18 compensate for the non-uniform light output along the length of the fluorescent tubes 16 such that the entire width of the document 14 scan line is illuminated with the desired distribution. Further, the masks 18 compensate for the $\cos^4$ drop-off as the reflected light passes through the imaging lens 28.

Those skilled in the art will appreciate that although the present system simultaneously scans the entire width of the document 14, only a small vertical portion of each line of text is scanned in one scan operation. Thus, the document 14 must be vertically incremented to position it for each scan operation. Typically, the vertical distance scanned is approximately five thousandths (0.005) an inch for each scan line.

The light from the fluorescent tubes 16 illuminates the document 14 scan line and is reflected off the document 14 in proportion to the black/white content of the document 14 line being scanned. Light reflected off the document 14 scan line follows the path indicated by broken lines. Thus, the reflected light hits the flat surface 20 of mirror 22, is bounced onto the flat surface 24 of mirror 26, returns again to the surface 20 of mirror 22, is reflected back to the surface 24 of mirror 26, and then travels along the axis indicated and is received by lens system 28. In the preferred embodiment, lens system 28 is a spherical, aberration-free lens system 28 mounted to receive light reflected from the document 14 scan line via mirrors 22 and 26.

Mirrors 22 and 26 are mounted to frame 30 via adhesive 32. The mirrors 22,26 are properly aligned to implement the required folded reflection path using the apparatus described in pending U.S. patent application Ser. No. 548,553, filed Nov. 3, 1983.

Behind the lens system 28 is positioned a photoelectric sensor 34 for converting light reflected from each unit area of the document 14 line being scanned to electrical signals. In the preferred embodiment, the photoelectric sensor 34 is a CCD image sensor 34 having a large number of photoelectric conversion elements arranged in a line, each element receiving reflected light from a unit area of each document 14 scan line.

Figure 2:
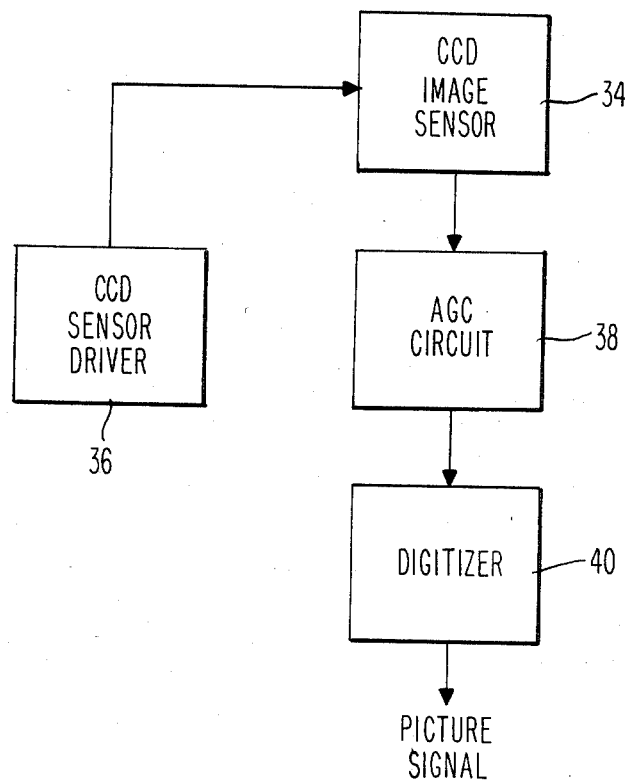
FIG. 2 is a block diagram illustrating typical elements for converting reflected light received by an image sensor to a picture signal.

FIG. 2 shows typical elements utilized to convert the reflected light received by image sensor 34 to a picture signal. The CCD image sensor 34 utilizes a plurality of clock signals produced in a control section (not shown). The sensor drivers 36 convert these clock signals into voltages appropriate to the sensor 34. The AGC circuit 38 maintains the picture signal output by the sensor 34 nearly constant against differences in color and density of the documents 14 and fluctuations in the brightness of the fluorescent tubes 16. It assumes areas reflecting the light most to be white and operates so that outputs for these areas are constant.

The CCD image sensor 34 outputs analog signals proportional to input light intensity. The digitizer 40 converts the analog signals into binary signals, "1" for white and "0" for black.

It should be noted that the description of the conversion subsystem of FIG. 2 is merely illustrative of one technique for converting light reflected from the document 14 line being scanned into a digital image. Those skilled in the art will therefore appreciate that many alternative techniques are available.

Figure 3:
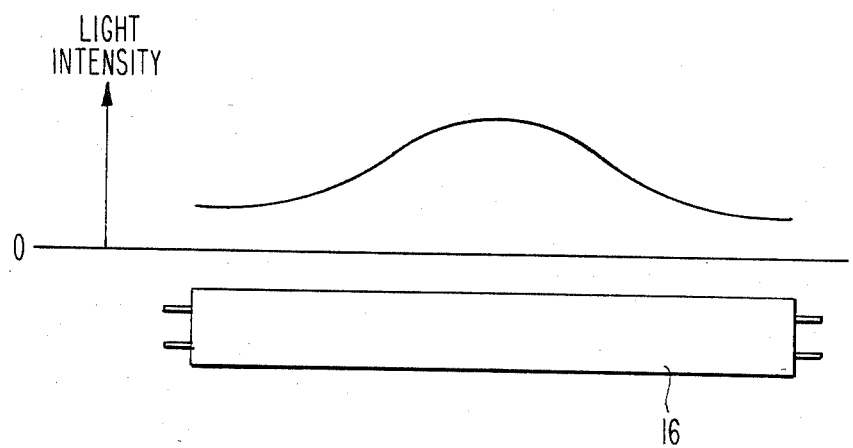
FIG. 3 roughly illustrates the light intensity output along the length of a fluorescent tube.

As previously discussed, the fluorescent tubes 16 utilized in the preferred embodiment are standard sixty degree aperture type. FIG. 3 roughly illustrates the intensity of light output by the tubes 16 at points along their length. As shown, light output is highest at the center of each tube's length and falls off towards the ends of the tube 16. The pattern of light intensity output by each tube 16 is roughly sinusoidal.

In order to provide the desired illumination along the entire width of the document 14 line being scanned, the present invention provides a mask 18 (FIG. 4) which compensates for the non-uniform light output of the fluorescent tubes 16 and the $\cos^4$ drop-off of the imaging lens 28. As shown in FIG. 1, the mask 18 is mechanically held in place tangential to the surface of each tube 16 (by means not shown) and extends completely across the aperture and length of each tube 16. Since the mask 18 is placed between the illumination source (tubes 16) and the object plane (document 14) and not between the lens system 28 and the object plane, the modulation transfer of the system 10 is not affected.

The masks 18 (FIG. 4) are fabricated photographically onto strips of emulsion coated clear mylar using techniques well known to those of ordinary skill in the photographic arts. The photographic image which is recorded on the mylar strip is a pattern of alternating black and clear sections, the black sections being in the form of lines 42.

The pattern of black lines 42 on the mylar strip mask 18 is chosen to provide the desired light level distribution by blocking portions of the light emitted by each fluorescent tube 16 from reaching the document 14. Those skilled in the art will appreciate that there are several factors which must be considered when determining the distribution of the black lines 42 on the mask 18. These factors include:

The polar pattern of the illumination source (which are fluorescent tubes 16 in the preferred embodiment);

The image plane light level dropoff due to lens system 28; and

The transmissivity of the clear mylar.

Those skilled in the art will also appreciate that these three factors can be calculated or measured for the particular imaging system. A well known series of mathematical calculations can then be used to compute the distribution of black lines 42 needed to produce the desired image plane distribution. Thus, a first calculation computes the image plane light distribution without the mask 18. A second calculation computes the object plane light distribution that will be required to produce the desired final image plane light distribution. A final calculation computes the distribution of black lines 42 needed to produce the required object plane distribution. Those skilled in the art will further appreciate that these calculations are dependent on factors such as the type of illumination source, the type of lens system 28 utilized, the sensitivity of the CCD image sensor 34, the angle of light reflection and the spacing of the imaging system components.

Due to the complexity of accounting for all of the latter mentioned factors, empirical methods may be more easily utilized to determine or refine the distribution of black lines 42 on the masks 18. Thus, in the preferred embodiment as shown in FIG. 1, an oscilloscope was utilized to measure the output of each element of the CCD image sensor 34. An all white line was scanned and the spacing of lines 42 adjusted until a uniform output from each sensor 34 element was obtained. Those skilled in the art will appreciate that an optimum final pattern of black lines 42 is quite easy to obtain and is dependent on the tolerances of the sensor 34 and the detection circuitry (FIG. 2) which receives the output of the sensor 34.

Figure 4:
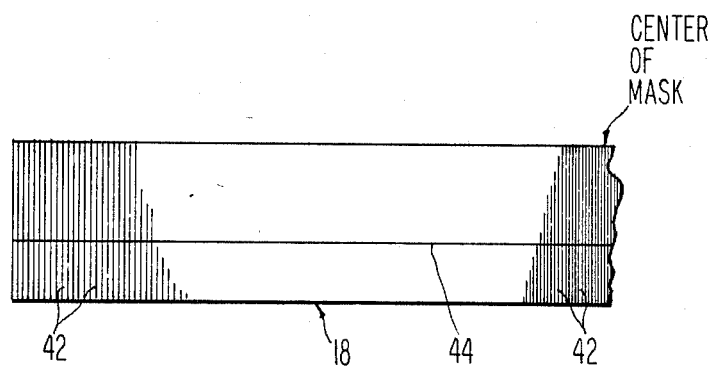
FIG. 4 is a front plan view showing a portion of of the mask used to control fluorescent light level distribution in the line scan optical imaging system of FIG. 1.

Once an optimum mask pattern for the using optical system is obtained, a master mask with the optimum distribution of black lines 42 is drawn. The master is photographically reduced and exposed onto an emulsion coated mylar sheet. The sheet can then be cut into strips for installation into the imaging system 10. FIG. 4 shows in enlarged scale a portion of the mask 18 utilized in the system of FIG. 1. The lateral line 44 in the mask 18 pattern is provided for optically aligning the mask 18 in the using optical system 10 and does not appreciably affect the light distribution reaching the document 14 scan line.

FIG. 1 shows the actual spatial relationship of the elements used in the preferred embodiment of the present imaging system. In the preferred embodiment of the invention, two fifteen inch long, sixty degree aperture fluorescent tubes 16 are utilized to illuminate the document 14 line being scanned. The mask 18 pattern utilized in the preferred embodiment is shown in FIG. 4. In actuality, the length of the masks 18 is the same as the length of each tube 16. Each mask 18 is fabricated with a greater frequency of black lines 42 in the center regions, the density of black lines 42 decreasing symetrically as the ends of the mask 18 are approached. The effect of this mask 18 pattern is to restrict more light transmission at the center of the pattern than at the ends. As a result, the light intensity reaching the document 14 is brighter at the edges of the document 14 scan line.

Although the preferred embodiment of the mask 18 is utilized in a system employing two fluorescent tubes to illuminate the document 14, those skilled in the art will appreciate that a similar mask 18 structure may be utilized with other types of light sources and in systems having one or more than two light sources. Further, the same type of mask 18 with a different pattern of lines 42 may be utilized to obtain any desired distribution which may be required in other types of imaging, photographic, or, for that matter, any system or apparatus which requires controlled illumination.

Having shown and described the preferred embodiment of the present invention, those skilled in the art will realize that various omissions, substitutions and changes in forms and details may be made without departing from the spirit of the invention. It is the intention, therefore, for the scope of the invention to be limited only as indicated in the following claims.

What is claimed is:

1. A line scan optical imaging system including means for illuminating a line of a printed document and means for converting light reflected from the line of print to electrical signals, wherein the improvement comprises: mask means, positioned between said illuminating means and said document, for controlling light transmitted from said illuminating means to said printed document line about a longitudinal axis thereof, said mask means having a pattern of opaque markings varying longitudinally with respect to the longitudinal axis, said pattern defined by an overlay of a plurality of irregularly spaced lines perpendicular to the longitudinal axis.

2. The system in accordance with claim 1 wherein the frequency of the plurality of irregularly spaced perpendicular lines is proportional to the brightness levels of the illuminating means at longitudinal points thereof.

3. The system in accordance with claim 1 wherein said mask means is positioned adjacent to said illuminating means.

4. The system in accordance with claim 1 wherein said illuminating means includes means for simultaneously illuminating the entire line of said printed document.

5. The system in accordance with claim 1 wherein each one of said plurality of irregularly spaced perpendicular lines is of equal length.

6. The system in accordance with claim 5 wherein each one of said plurality of irregularly spaced perpendicular lines is of equal size.

7. The imaging system in accordance with claim 1 wherein said mask means in a linear strip mask, said linear strip mask fabricated from an emulsion coated clear strip of material.

8. The imaging system in accordance with claim 7 wherein said emulsion is photographically processed to record a pattern of alternating black and clear sections along the length of the clear strip.

9. The imaging system in accordance with claim 8 wherein said pattern is chosen to block portions of the light from said illuminating means from reaching the line of print, whereby the line of print is illuminated with a selected distribution which is dependent on the pattern of alternating black and clear sections.

10. The imaging system in accordance with claim 1 wherein said illuminating means includes a fluorescent tube light source, said mask means for partially blocking light from said fluorescent tube from reaching said line of said printed document.

11. The imaging system in accordance with claim 10 wherein said mask means includes a clear strip of material positioned parallel with the longitudinal axis of said fluorescent tube, sections of said strip coated with an opaque coating to form a pattern which partially blocks light emanating from the fluorescent tube from reaching the line of said printed document.

12. The imaging system in accordance with claim 11 wherein said pattern includes a plurality of opaque irregularly spaced apart lines perpendicular to the longitudinal axis of said strip, the frequency of said lines being greatest adjacent to points along said fluorescent tube where the light output is greatest, the frequency of said lines being lower at points along said fluorescent tube where the light output is least.

13. The imaging system in accordance with claim 12 wherein said strip is coated with a photographic emulsion and said lines are produced by a photographic technique.

14. The imaging system in accordance with claim 11 wherein said pattern includes a plurality of opaque spaced apart lines perpendicular to the longitudinal axis of said strip, the frequency of said lines being greatest at a point adjacent to the center of said fluorescent tube and decreasing in frequency as points along the strip adjacent to the ends of the tube are approached.

15. The imaging system in accordance with claim 14 wherein said strip is positioned tangential to the surface of said fluorescent tube.

16. The imaging system in accordance with claim 14 wherein said fluorescent tube has an aperture and said mask means covers the entire aperture along the entire length of said fluorescent tube.

17. A mask for controlling image plane light level distribution from a source of illumination, said mask comprising a clear substrate, said substrate coated with a plurality of opaque parallel lines, the frequency of said parallel lines increasing in areas adjacent to the image plane where it is desired to decrease the amount of light reaching the image plane.

18. The mask in accordance with claim 17 wherein said substrate is coated with a photographic emulsion, and said lines are produced by first projecting a pattern corresponding to the desired line distribution onto said coated strip and then developing said emulsion.

19. The mask in accordance with claim 17 wherein said source of illumination is a fluorescent tube and said mask is in the shape of a strip, said plurality of opaque parallel lines running perpendicular to the longitudinal axis of said strip, said strip positioned parallel to and between said flurorescent tube and said image plane, the frequency of said parallel lines being greatest in an area adjacent to the center of said fluorescent tube and decreasing as the ends of said strip are approached.

20. A line scan optical imaging system for scanning a line of a document comprising:
   means for simultaneously illuminating the entire length of said document line;
   mirror means for transmitting light reflected from said document line;
   lens means for receiving a focusing light transmitted by said mirror means;
   photo-optical means for converting said focused light into a plurality of electrical signals; and
   mask means, positioned between said illuminating means and said document line, for blocking portions of the light output from said illuminating means from reaching said document line, said mask means having a pattern of irregularly spaced parallel lines thereon.

21. The line scan imaging system in accordance with claim 20 wherein:
   said illuminating means includes at least one fluorescent tube; and
   said mask means is a linear strip mask positioned between said fluorescent tube and said document, said strip mask including a clear substrate coated with said pattern of irregularly spaced parallel lines, said parallel lines being perpendicular to the longitudinal axis of said substrate.

22. The line scan imaging system in accordance with claim 21 wherein the frequency of said parallel lines is greatest at an area near the center of said fluorescent tube and decreases in frequency as the ends of said linear strip mask are approached.

23. The line scan imaging system in accordance with claim 22 wherein said illuminating means includes two of said fluorescent tubes, each of said tubes being of an aperture type and wherein the aperture area of each of said fluorescent tubes has one of said strip masks adjacent to it.

24. The line scan imaging system in accordance with claim 23 wherein said mirror means is of the folded mirror type and said photo-optical means includes a large number of photoelectric conversion elements arranged in a line, each element receiving focused light from a unit area of said document line.

* * * * *